(12) United States Patent
Negron et al.

(10) Patent No.: US 12,365,289 B2
(45) Date of Patent: Jul. 22, 2025

(54) ACCESSIBLE AND DEPLOYABLE SUPPORT SURFACE FOR A VEHICLE STORAGE AREA

(71) Applicant: GM Global Technology Operations LLC, Detroit, MI (US)

(72) Inventors: Adriana Maria Negron, Southfield, MI (US); Cynthia S. Matusik, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 324 days.

(21) Appl. No.: 18/083,784

(22) Filed: Dec. 19, 2022

(65) Prior Publication Data

US 2024/0198912 A1  Jun. 20, 2024

(51) Int. Cl.
*B60R 7/02* (2006.01)
*B60R 5/04* (2006.01)
*B60R 11/00* (2006.01)
*B66F 7/06* (2006.01)

(52) U.S. Cl.
CPC .......... *B60R 7/02* (2013.01); *B60R 5/04* (2013.01); *B60R 11/00* (2013.01); *B66F 7/065* (2013.01); *B66F 7/0658* (2013.01); *B60R 2011/0036* (2013.01); *B60R 2011/0082* (2013.01); *B60R 2011/0084* (2013.01)

(58) Field of Classification Search
CPC ... B62D 43/10; B60R 2011/0036; B60R 5/04; B60R 5/045; B60R 2011/0082; B60R 2011/0084; B60R 3/002; B60R 3/004; B60R 5/02; B60R 7/02; B66F 7/0608; B60P 1/003; A47B 1/05; A47B 2200/0046; A47B 3/10; A47B 2001/053; A47B 77/10; A47B 2001/085
See application file for complete search history.

(56) References Cited

U.S. PATENT DOCUMENTS

| 4,799,849 | A | * | 1/1989 | Miller | B66F 7/02 414/522 |
| 4,969,793 | A | * | 11/1990 | Pawl | B62D 43/10 414/641 |
| 5,054,578 | A | * | 10/1991 | Smillie, III | B60R 5/04 187/269 |

(Continued)

FOREIGN PATENT DOCUMENTS

| DE | 29608955 U1 | 9/1996 |
| DE | 19620294 A1 | 11/1997 |

(Continued)

OTHER PUBLICATIONS

German Office Action for German Application No. 102023120817.9; dated Mar. 13, 2024; 7 pages.

(Continued)

*Primary Examiner* — Daniel J Colilla
(74) *Attorney, Agent, or Firm* — CANTOR COLBURN LLP

(57) ABSTRACT

A deployable support surface for a vehicle storage area having an opening defined by an edge includes a support member including a first surface and a second surface opposite the first surface and an adjustment mechanism coupled to the support member. The adjustment mechanism selectively raises the first surface to the edge of the opening.

14 Claims, 5 Drawing Sheets

(56) References Cited

U.S. PATENT DOCUMENTS

| | | | |
|---|---|---|---|
| 5,301,992 A * | 4/1994 | Whitmore | B60R 5/04 296/26.1 |
| 9,828,222 B2 | 11/2017 | Nedelman | |
| 11,858,426 B2 | 1/2024 | Cho et al. | |
| 2023/0063725 A1* | 3/2023 | Cho | B60P 1/02 |
| 2023/0339383 A1* | 10/2023 | Nguyen | B60P 1/6427 |

FOREIGN PATENT DOCUMENTS

| | | |
|---|---|---|
| DE | 102008010392 A1 | 8/2009 |
| DE | 102013006764 A1 | 10/2014 |
| DE | 102014009800 A1 | 1/2016 |
| DE | 102022108704 A1 | 10/2023 |
| WO | 8907569 A1 | 8/1989 |
| WO | 9845143 A1 | 10/1998 |

OTHER PUBLICATIONS

German Office Action for German Application No. 102023120817.9; dated Feb. 2, 2024; 8 pages.

\* cited by examiner

ACCESSIBLE AND DEPLOYABLE SUPPORT
SURFACE FOR A VEHICLE STORAGE AREA

INTRODUCTION

The subject disclosure relates to support surfaces and, more particularly, to an accessible and deployable support surface for a vehicle storage area.

Vehicles include storage areas that provide space for a user to store various items. The vehicle may include a rear storage area or "Trunk" and/or a front storage area or "Frunk". During vehicle operation, items may shift to an inner portion of the storage area. Depending on the size of the vehicle and or storage area, retrieving the items may be a challenge for certain people. Older people, people having a short stature, and/or people with disabilities may find accessing inner portions of a trunk and/or frunk difficult or awkward.

Many users employ trunk organizers to hold various items in the storage area. While the organizers may help keep items from moving around, accessing the inner portion of the storage area, even with the organizer, remains difficult and/or awkward. Accordingly, it is desirable to provide a system that will allow users to more easily access portions of a trunk and/or a frunk to retrieve stored items.

SUMMARY

In accordance with a non-limiting example, a deployable support surface for a vehicle storage area having an opening defined by an edge includes a support member including a first surface and a second surface opposite the first surface and an adjustment mechanism coupled to the support member. The adjustment mechanism selectively raises the first surface to the edge of the opening.

In addition to one or more of the features described herein the adjustment mechanism is mounted to the second surface.

In addition to one or more of the features described herein a power assist mechanism is operatively connected to the support member and the adjustment mechanism.

In addition to one or more of the features described herein the power assist mechanism includes one of a spring, a hydraulic cylinder, and a motor.

In addition to one or more of the features described herein another support member is moveably mounted relative to the first surface.

In addition to one or more of the features described herein the support member includes a first edge, a second edge opposite the first edge, a first side edge, and a second side edge opposite the first side edge, the another support member selectively shifting from a first position covering the first surface to a second position extending outwardly of the first edge.

In addition to one or more of the features described herein a wall projects outwardly of the first surface, the wall including a first wall portion arranged on the first side edge, a second wall portion arranged on the second side edge, and a third wall portion arranged on the second edge, the third wall portion being connected with the first wall portion and the second wall portion.

In addition to one or more of the features described herein a support element is arranged along the first edge, the support element including a support surface portion that is off-set relative to the first surface, wherein when in the second position, the another support member rests on the support surface portion.

In addition to one or more of the features described herein the another support member includes an upper surface that is substantially coplanar with the first surface when the another support member is in the second position.

In addition to one or more of the features described herein a vertically height adjustable deployable leg system is mounted to the another support member, wherein when the another support member is in the first position, the vertically height adjustable deployable leg system is arranged between the first surface and the another support member and when the another support member is in the second position, the vertically height adjustable deployable leg system including a first support leg having a first leveler and a second support leg having a second leveler, the first support leg and the second support leg being downwardly pivotable to be deployed with the first leveler and the second leveler being selectively adjustable to substantially level the support member.

A vehicle, in accordance with a non-limiting example, includes a body including a passenger compartment and at least one storage area including an opening having an edge and a deployable support surface arranged in the at least one storage area. The deployable support surface including a support member having a first surface and a second surface opposite the first surface. An adjustment mechanism is coupled to the support member. The adjustment mechanism selectively raises the first surface to the edge of the opening.

In addition to one or more of the features described herein the adjustment mechanism is mounted to the second surface.

In addition to one or more of the features described herein a power assist mechanism is operatively connected to the support member and the adjustment mechanism.

In addition to one or more of the features described herein the power assist mechanism includes one of a spring, a hydraulic cylinder, and a motor.

In addition to one or more of the features described herein another support member is moveably mounted relative to the first surface.

In addition to one or more of the features described herein the support member includes a first edge, a second edge opposite the first edge, a first side edge, and a second side edge being opposite the first side edge, the another support member selectively shifting from a first position covering the first surface to a second position extending outwardly of the first edge.

In addition to one or more of the features described herein a wall projects outwardly of the first surface, the wall including a first wall portion arranged on the first side edge, a second wall portion arranged on the second side edge, and a third wall portion arranged on the second edge, the third wall portion being connected with the first wall portion and the second wall portion.

In addition to one or more of the features described herein a support element arranged along the first edge, the support element including a support surface portion that is off-set relative to the first surface, wherein when in the second position, the another support member rests on the support surface portion.

In addition to one or more of the features described herein the another support member includes an upper surface that is substantially coplanar with the first surface when the another support member is in the second position.

In addition to one or more of the features described herein a vertically height adjustable deployable leg system is mounted to the another support member, wherein when the another support member is in the first position, the vertically height adjustable deployable leg system is arranged between the first surface and the another support member and when the another support member is in the second position, the vertically height adjustable deployable leg system including a first support leg having a first leveler and a second support leg having a second leveler, the first support leg and the second support leg being downwardly pivotable to be deployed with the first leveler and the second leveler being selectively adjustable to substantially level the support member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
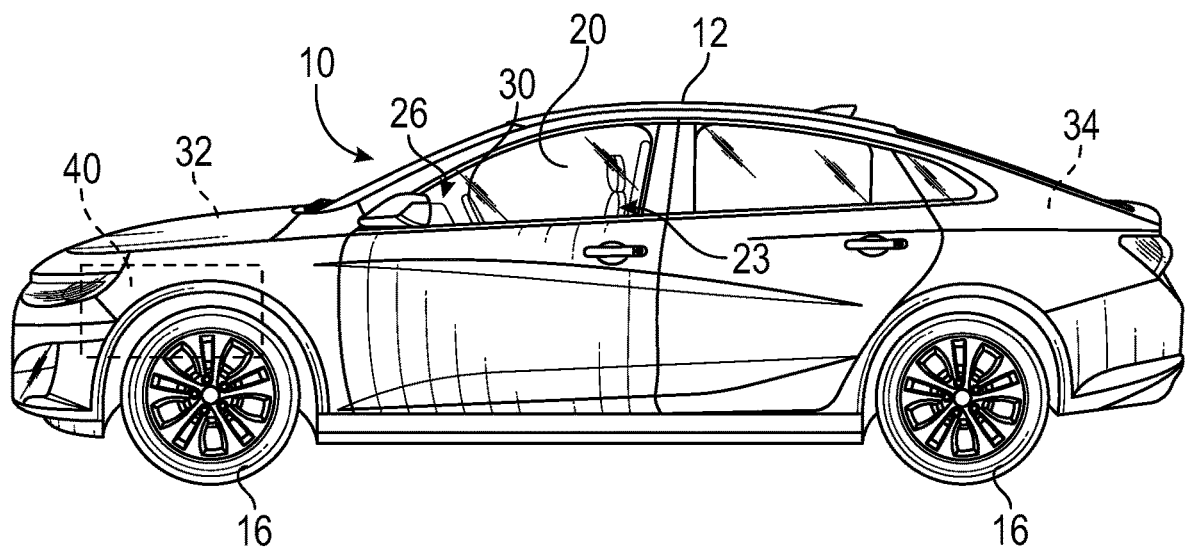
FIG. 1 is a left side view of a vehicle including a storage area having arranged therein a deployable support surface, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
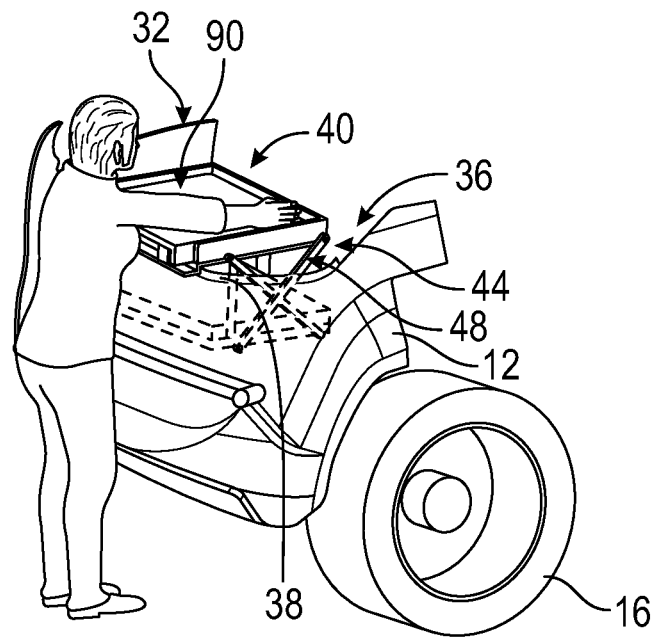
FIG. 2 is a partial perspective view of a deployable support surface in a raised position, in accordance with a non-limiting example.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23, positioned behind a dashboard 26. A steering control system 30 is arranged between seats 23 and dashboard 26. Vehicle 10 includes a forward storage area or frunk 32 and a rear storage area or trunk 34. As shown in FIG. 2, frunk 32 includes an opening 36 defined in part by an edge 38. Opening 36 allows items to be placed into and removed from frunk 32. Trunk 34 includes similar structure.

Figure 3:
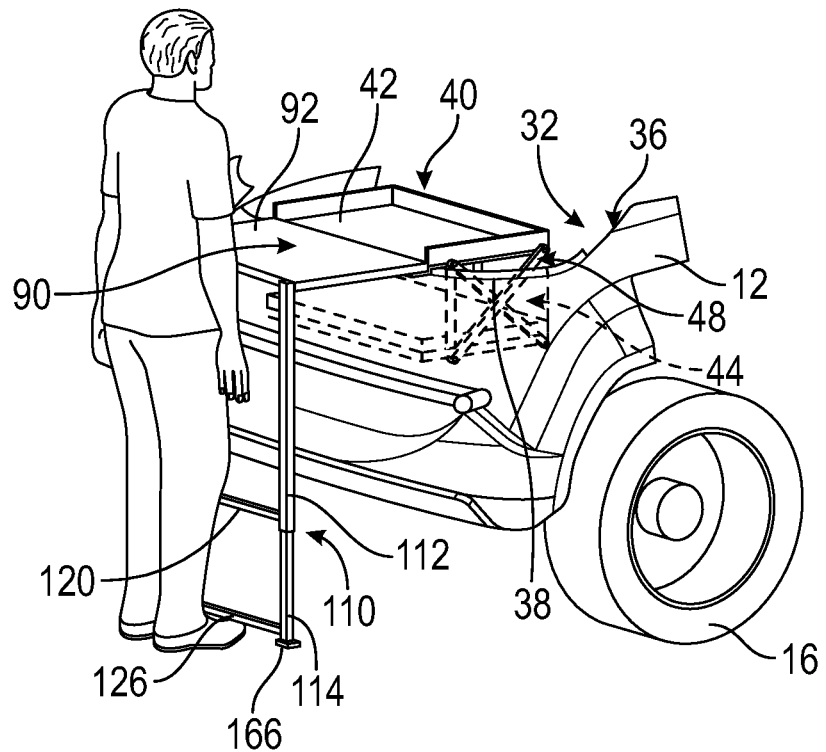
FIG. 3 is a partial perspective view of the deployable support surface in a raised and extended position, in accordance with a non-limiting example.

In accordance with a non-limiting example, a deployable support surface 40 is arranged in frunk 32 as shown in FIG. 2 and FIG. 3. At this point, it should be understood that deployable support surface 40 may also be installed in trunk 34. Deployable support surface 40 includes a first support member 42 (FIG. 3) coupled to an adjustment mechanism 44. Adjustment mechanism 44 includes a first scissor mechanism 46 (FIG. 4) and a second scissor mechanism 48 connected to first support member 42. First and second scissor mechanisms 46 and 48 are selectively adjustable in order to transition first support member 42 between a stored or collapsed configuration (FIG. 1) and a deployed configuration (FIG. 2).

Figure 4:
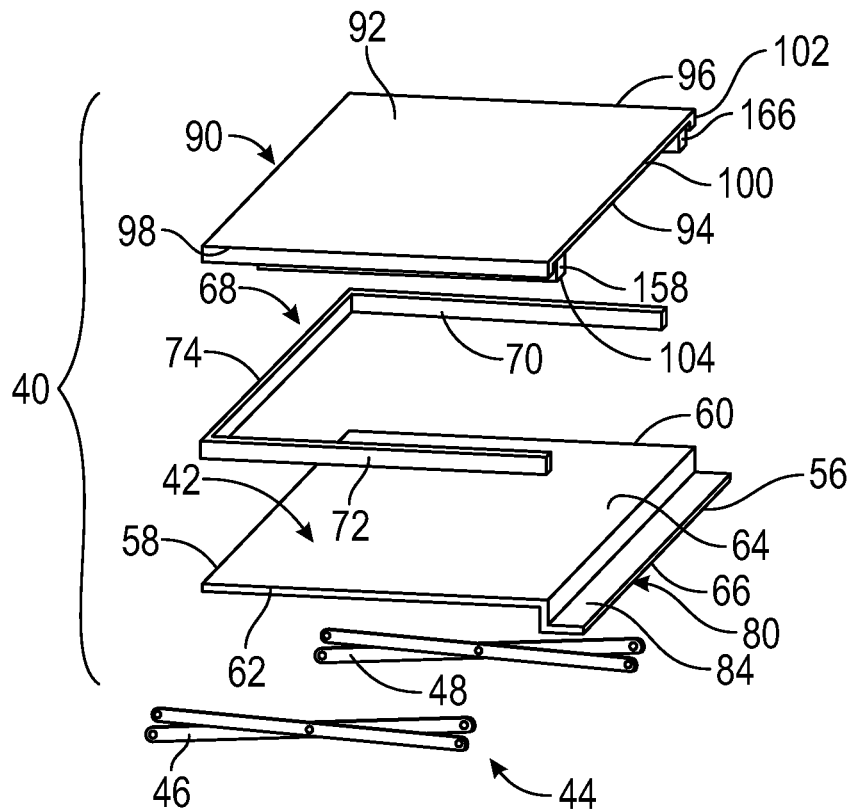
FIG. 4 is a disassembled view of the deployable support surface, in accordance with a non-limiting example.
Figure 5:
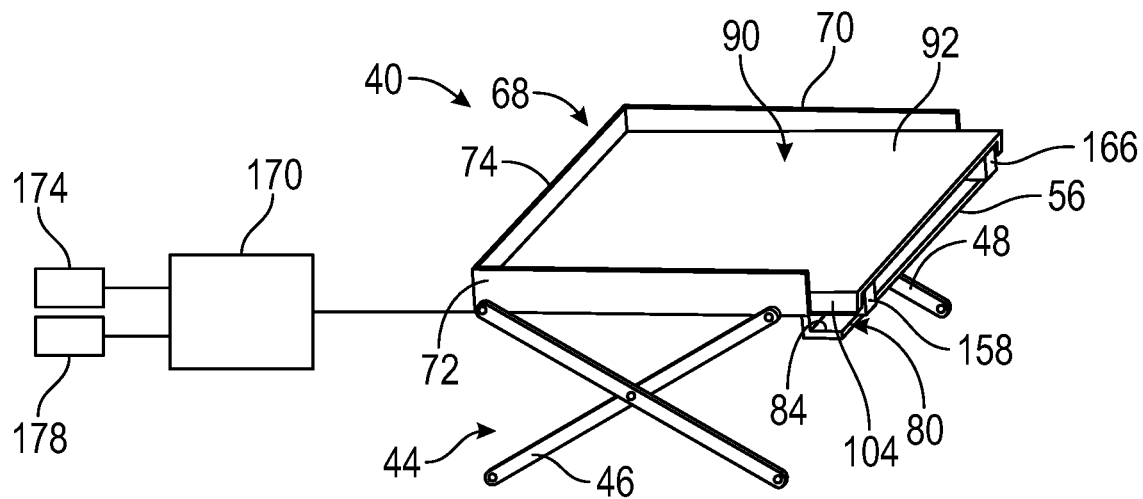
FIG. 5 is a perspective view of the deployable support surface outside of the storage area, in accordance with a non-limiting example.

Referring now to FIG. 4, and with continued reference to FIGS. 2 and 3, first support member 42 includes a first edge 56, a second edge 58, a first side edge 60, and a second side edge 62. First edge 56 defines a forward edge and second edge 58 defines a rear edge relative to a user. First edge 56 may be vertically offset relative to second edge 58 as will be detailed more fully herein. First support member 42 includes a first surface 64 and a second surface 66. First surface 64 may take the form of a top surface and second surface 66, which is opposite first surface 64, may take the form of a bottom surface.

A wall 68 extends about a portion of first support member 42. Wall 68 includes a first wall portion 70 arranged along first side edge 60, a second wall portion 72 arranged along second side edge 62, and a third wall portion 74 arranged along second edge 58. Third wall portion 74 extends between and connects to first wall portion 70 and second wall portion 72. In addition to wall 68 which helps retain items on first surface 64, first support member 42 includes a support element 80 arranged along first edge 56. Support element 80 includes a support surface portion 84 that is offset relative to second surface 66.

In a non-limiting example, a second support member 90 is slidingly supported relative to first surface 64 of first support member 42. Second support member 90 includes a first surface portion 92 and a second surface portion 94 (FIG. 7) that is opposite to first surface portion 92. Thus, first surface portion 92 may define an upper surface and second surface portion 94 may define a lower surface. Second support member 90 includes a first side edge section 96, a second side edge section 98, and a forward edge section 100. A first edge support 102 is mounted to second surface portion 94 and extends along first side edge section 96. A second edge support 104 is mounted to second surface portion 94 along second side edge section 98.

Figure 6:
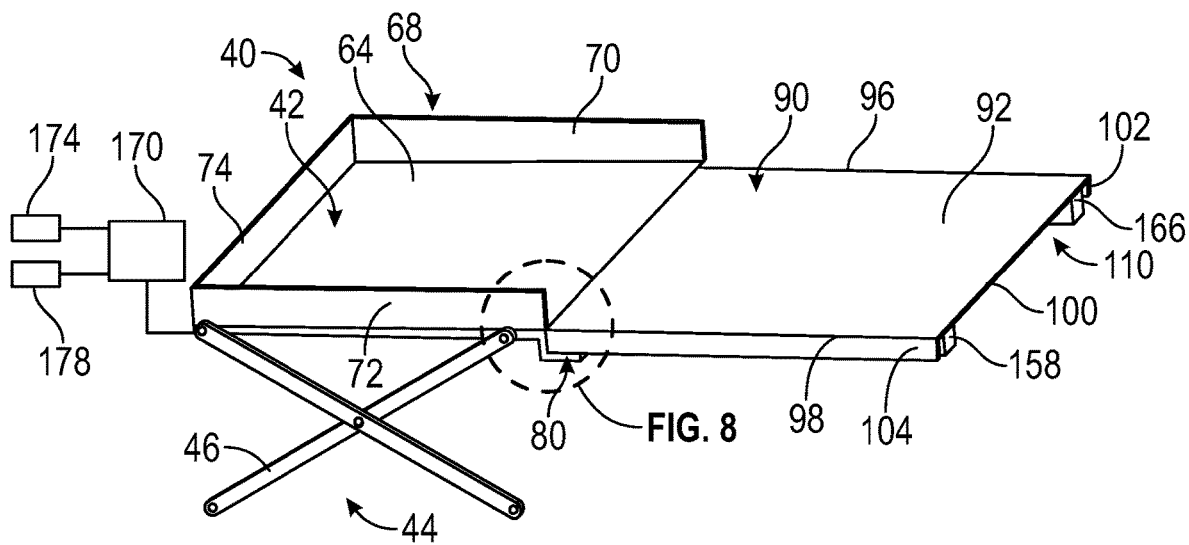
FIG. 6 is a perspective view of the deployable support surface outside of the storage area, in accordance with a non-limiting example.

In a non-limiting example, second support member 90 may transition between a first position as shown in FIGS. 2 and, 5 and a second or extended position as shown in FIGS. 3 and 6. In the second position, second support member 90 rests on support surface portion 84 of support element 80 such that first surface 64 of first support member 42 and first surface portion 92 of second support member 90 are substantially coplanar. In accordance with a non-limiting example shown in FIGS. 3, 6 and 7, a vertically height adjustable deployable leg system 110 is mounted to second support member 90. As will be detailed more fully herein, vertically height adjustable deployable leg system 110 is pivotably connected to second support member 90 between first edge support 102 and second edge support 104.

Figure 7:
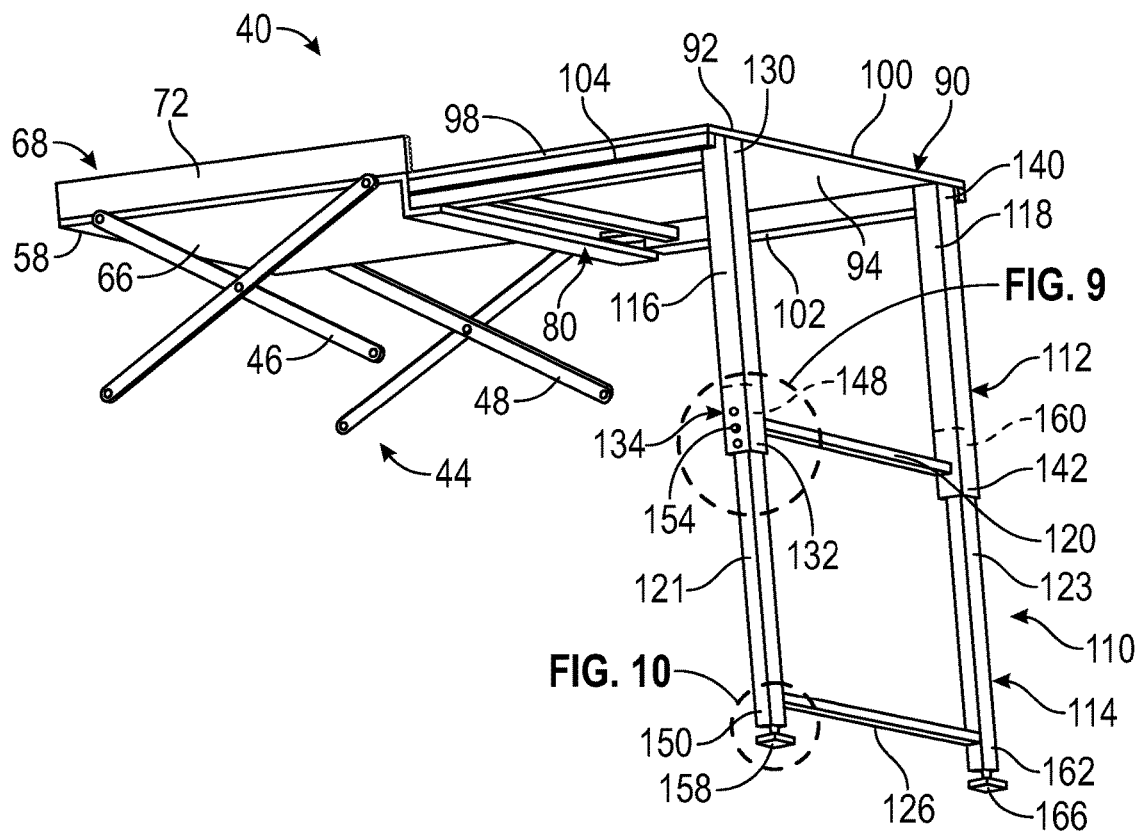
FIG. 7 depicts vertically height adjustable and deployable support members of the deployable support surface, in accordance with a non-limiting example.
Figure 8:
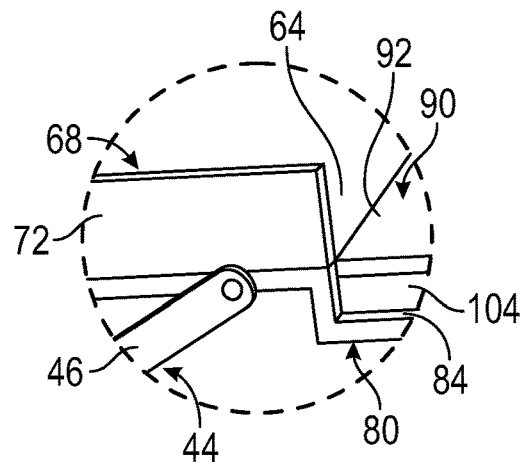
FIG. 8 is a detail view of a support element of the deployable support surface, in accordance with a non-limiting example.
Figure 9:
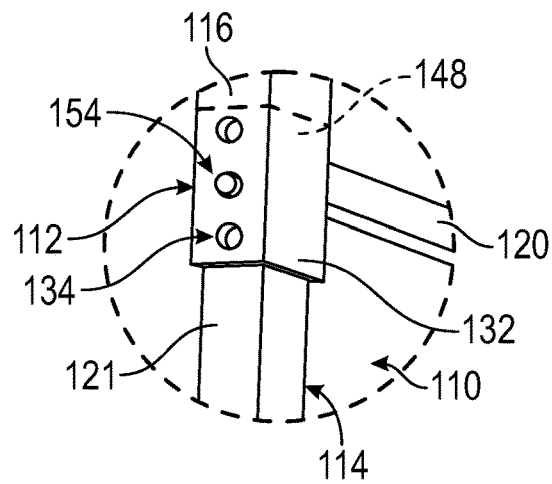
FIG. 9 is a detail view of a height adjustment mechanism of the vertically height adjustable and deployable support members, in accordance with a non-limiting example.

Reference will now follow to FIGS. 7, 8, and 9 when describing vertically height adjustable deployable leg system 110 in accordance with a non-limiting example. Vertically height adjustable deployable leg system 110 includes a stationary portion 112 and an adjustable portion 114. Stationary portion 112 is pivotally connected to second support member 90 between first and second edge supports 102 and 104 and includes a first support leg 116 and a second support leg 118 joined by a cross-member 120. First and second support legs 116 and 118 are hollow. Adjustable portion 114 includes a first support leg portion 121, a second support leg portion 123, and a cross-member portion 126. First support leg portion 121 and second support leg portion 123 are received by first support leg 116 and second support leg 118 respectively.

Figure 10:
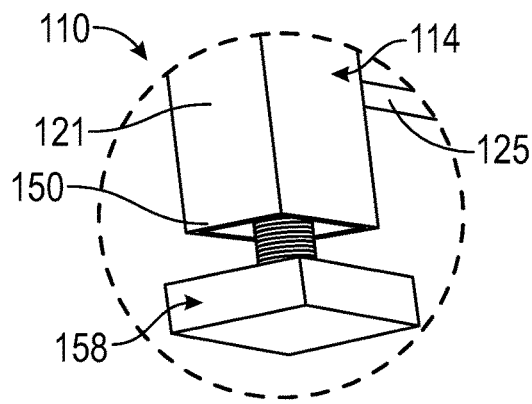
FIG. 10 is a detail view of an adjustable leg support and leveler of the vertically height adjustable and deployable support members, in accordance with a non-limiting example.

In a non-limiting example, first support leg 116 includes a first end 130 pivotally connected to second edge support 104 and a second end 132. Second end 132 includes a first plurality of openings 134 as shown in FIG. 9. Second support leg 118 includes a first end 140 pivotally connected to first edge support 102 and a second end 142. Second end 142 includes a second plurality of openings (not shown). First support leg portion 121 includes a first end portion 148 and a second end portion 150. First end portion 148 includes a retractable ball 154 that may be received in one of the first plurality of openings and second end portion 150 includes a first leveler 158 (FIG. 10). Second support leg portion 123 includes a first end section 160 and a second end section 162. First end section 160 supports a ball (not shown) that selectively engages one of the second plurality of openings (also not shown) and second end section 162 includes a second leveler 166.

In accordance with a non-limiting example, deployable support surface 40 may be arranged in frunk 32 in the stored configuration. Items may be stowed on second support member 90. Wall 68 prevents the items from scattering about frunk 32. As such, the items remain on first surface portion 92. When it is desired to retrieve the items, adjustment mechanism 44 may be activated to raise first and second support members 42 and 90 such that first surface 64 is at or above frunk edge 38 defining opening 36. At this point the items may be readily retrieved or second support member 90 may be extended out from frunk 32 to make access to the items even easier.

In a non-limiting example, deployable support surface 40 may transition into a work surface such as shown in FIG. 3 by raising first support member 42 above frunk edge 38, extending second support member 90, and deploying vertically height adjustable deployable leg system 110. Adjustable portion 114 may be extended from stationary portion 112 and locked in place by causing, for example, retractable ball 154 to engage into one of the first plurality of openings 134. First and second levelers 158 and 166 may be adjusted so that first surface portion 92 is substantially level or as close to level as desired.

In a non-limiting example, deployable support surface 40 includes a power assist mechanism 170 that aids users in manipulating adjustment mechanism 44 and second support member 90. Power assist mechanism 170 may include a first power assist member 174 that may take the form of a spring, a hydraulic cylinder, a pneumatic cylinder, a motor or the like that operates adjustment mechanism 44 to raise and lower first support member 42. A user may establish preset heights for first power assist member 174. For example, first power assist member 174 may, when activated, automatically raise first support member 42 to edge 38, or to a position that makes unloading of a wheelchair easier. A second power assist member 178 may be activated to shift second support member 90 relative to first support member 42.

At this point, it should be appreciated that the deployable support member in accordance with disclosed non-limiting examples may be arranged in a frunk and/or a truck to make accessing items easier. The deployable support member may be used to support shopping bags, tool bags, boxes, and/or lose items of any sort. Further, the deployable support member may be used to promote access to items that are typically cumbersome to remove from a vehicle such as a walker, a wheelchair or other assistive device. The list of uses for the deployable support member is endless.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A deployable support surface for a vehicle storage area having an opening defined by an edge comprising:
   a support member including a first surface and a second surface opposite the first surface;
   an adjustment mechanism coupled to the support member, the adjustment mechanism selectively raising the first surface to the edge of the opening; and
   another support member moveably mounted relative to the first surface;
   wherein the support member includes a first edge, a second edge opposite the first edge, a first side edge, and a second side edge opposite the first side edge, the another support member selectively shifting from a first position covering the first surface to a second position extending outwardly of the first edge; and wherein a support element is arranged along the first edge, the support element including a support surface portion that is off-set relative to the first surface, wherein when in the second position, the another support member rests on the support surface portion.

2. The deployable support surface according to claim 1, wherein the adjustment mechanism is mounted to the second surface.

3. The deployable support surface according to claim 1, further comprising a power assist mechanism operatively connected to the support member and the adjustment mechanism.

4. The deployable support surface according to claim 3, wherein the power assist mechanism includes one of a spring, a hydraulic cylinder, and a motor.

5. The deployable support surface according to claim 1, further comprising a wall projecting outwardly of the first surface, the wall including a first wall portion arranged on the first side edge, a second wall portion arranged on the second side edge, and a third wall portion arranged on the second edge, the third wall portion being connected with the first wall portion and the second wall portion.

6. The deployable support surface according to claim 1, wherein the another support member includes an upper surface that is substantially coplanar with the first surface when the another support member is in the second position.

7. The deployable support surface according to claim 1, further comprising a vertically height adjustable deployable leg system mounted to the another support member, wherein when the another support member is in the first position, the vertically height adjustable deployable leg system is arranged between the first surface and the another support member and when the another support member is in the second position, the vertically height adjustable deployable leg system including a first support leg having a first leveler and a second support leg having a second leveler, the first support leg and the second support leg being downwardly pivotable to be deployed with the first leveler and the second leveler being selectively adjustable to substantially level the support member.

8. A vehicle comprising:
a body including a passenger compartment and at least one storage area including an opening having an edge; and
a deployable support surface arranged in the at least one storage area, the deployable support surface comprising:
a support member including a first surface and a second surface opposite the first surface;
an adjustment mechanism coupled to the support member, the adjustment mechanism selectively raising the first surface to the edge of the opening; and
another support member moveably mounted relative to the first surface;
wherein the support member includes a first edge, a second edge opposite the first edge, a first side edge, and a second side edge being opposite the first side edge, the another support member selectively shifting from a first position covering the first surface to a second position extending outwardly of the first edge; and
wherein a support element is arranged along the first edge, the support element including a support surface portion that is off-set relative to the first surface, wherein when in the second position, the another support member rests on the support surface portion.

9. The vehicle according to claim 8, wherein the adjustment mechanism is mounted to the second surface.

10. The vehicle according to claim 8, further comprising a power assist mechanism operatively connected to the support member and the adjustment mechanism.

11. The vehicle according to claim 10, wherein the power assist mechanism includes one of a spring, a hydraulic cylinder, and a motor.

12. The vehicle according to claim 8, further comprising a wall projecting outwardly of the first surface, the wall including a first wall portion arranged on the first side edge, a second wall portion arranged on the second side edge, and a third wall portion arranged on the second edge, the third wall portion being connected with the first wall portion and the second wall portion.

13. The vehicle according to claim 8, wherein the another support member includes an upper surface that is substantially coplanar with the first surface when the another support member is in the second position.

14. The vehicle according to claim 8, further comprising a vertically height adjustable deployable leg system mounted to the another support member, wherein when the another support member is in the first position, the vertically height adjustable deployable leg system is arranged between the first surface and the another support member and when the another support member is in the second position, the vertically height adjustable deployable leg system including a first support leg having a first leveler and a second support leg having a second leveler, the first support leg and the second support leg being downwardly pivotable to be deployed with the first leveler and the second leveler being selectively adjustable to substantially level the support member.

* * * * *